United States Patent
Asimopoulos et al.

(10) Patent No.: US 6,195,467 B1
(45) Date of Patent: Feb. 27, 2001

(54) METHOD AND APPARATUS FOR SHARPENING A GRAYSCALE IMAGE

(75) Inventors: Nikos Asimopoulos, Blacksburg; Alexander M. Barry, Christiansburg; Morton Nadler, Blacksburg, all of VA (US)

(73) Assignee: Image Processing Technologies, Inc., Vienna, VA (US)

(*) Notice: Subject to any disclaimer, the term of this patent is extended or adjusted under 35 U.S.C. 154(b) by 0 days.

(21) Appl. No.: 09/276,472

(22) Filed: Mar. 25, 1999

(51) Int. Cl.[7] .............................. G06T 5/00; H04N 1/407; H04N 1/409
(52) U.S. Cl. .................... 382/261; 382/263; 382/266; 382/274; 382/192; 382/205
(58) Field of Search ............................... 382/274, 261, 382/263, 264, 260, 266, 269, 254, 192, 205, 271; 358/455, 447

(56) References Cited

U.S. PATENT DOCUMENTS

| | | |
|---|---|---|
| 4,509,195 | 4/1985 | Nadler . |
| 4,541,116 | 9/1985 | Lougheed . |
| 4,546,433 | 10/1985 | Tucker . |
| 4,571,635 | 2/1986 | Mahmoodi et al. . |
| 4,724,544 | 2/1988 | Matsumoto . |
| 4,783,840 | 11/1988 | Song . |
| 4,827,533 | 5/1989 | Tanaka . |
| 4,833,723 * | 5/1989 | Loveridge et al. ................ 382/264 |
| 4,841,374 * | 6/1989 | Kotani et al. .................... 358/447 |
| 4,853,970 | 8/1989 | Ott et al. . |
| 4,941,190 * | 7/1990 | Joyce ................................ 382/264 |
| 4,984,286 * | 1/1991 | Dolazza .............................. 382/263 |
| 5,041,912 | 8/1991 | Schlig et al. . |
| 5,081,692 * | 1/1992 | Kwon et al. ...................... 382/263 |
| 5,271,064 | 12/1993 | Dhawan et al. . |
| 5,703,971 | 12/1997 | Asimopoulos et al. . |
| 5,710,840 | 1/1998 | Hideshima . |
| 5,784,499 * | 7/1998 | Kuwahara et al. ................ 382/264 |
| 5,903,681 * | 5/1999 | Rueby et al. ..................... 382/266 |
| 5,982,940 * | 11/1999 | Sawada .............................. 382/260 |

OTHER PUBLICATIONS

Raymond Offen, "VLSI Image Processing", McGraw–Hill, 1985, pp. 116–127.
Rafael C. Gonzalez, Paul Wintz, "Digital Image Processing", Addison–Wesley, 2nd Ed., 1987, pp. 18–21.
John C. Russ, "The Image Processing Handbook", CRC Press, 1992, pp. 1–13.
Morton Nadler, Eric Smith, "Pattern Recognition Engineering", Wiley–Interscience, 1993, pp. 108–113.

* cited by examiner

Primary Examiner—Scott Rogers
(74) Attorney, Agent, or Firm—Lawrence R. Franklin

(57) ABSTRACT

A digitized image is treated by an electronic system where pairs of pixels within a convolution window are compared, and for those differences which are greater than a preselected, or automatically calculated, threshold, a black or white vector is counted, respectively, depending on whether the more centrally located pixel is darker or lighter than the outer pixel. The central pixel is replaced with an enhanced value, if it is surrounded by a majority of significantly lighter or darker pixels, as indicated by the black and white vector counts. Weighting factors allows for custom tailoring the enhancement algorithm to suit the need of the particular image.

20 Claims, 9 Drawing Sheets

METHOD AND APPARATUS FOR SHARPENING A GRAYSCALE IMAGE

BACKGROUND OF THE INVENTION

1. Field of the Invention

This invention relates to a method and apparatus for sharpening a grayscale image.

Often, images produced by scanners, particularly when scanning low quality documents such as microfilm or microfiche, are themselves of low quality. One of the most common problems is that the grayscale image lacks sharpness. Many inventors have attempted to correct or improve the image of scanned documents, whether from video transmissions, paper copies, film, negatives, microfilm, or microfiche. Two patents from such inventors, the launching pad for this invention, are described in U.S. Pat. Nos. 4,509,195 and 5,703,971, issued to Morton Nadler and Asimopoulos et al, respectively, both assigned to Image Processing Technologies of Blacksburg, Va.

In the former patent a scanner digitizes the signals representative of data values, e.g., intensity values, of the pixels of an image and inputs the signals into a sharpening circuit. After a comparison of each pixel with its immediate neighbors, a Pseudo-Laplacian binarization algorithm replaces the intensity value of the pixel with a logical zero (0), representing white, or a logical one (1), representing black. The disclosed process works fine for documents in which the image is supposed to be either black or white, such as printed text on a white paper. But, important details are lost, when it is applied to images which have gradations of gray, for example, photographs or X-rays.

The Asimpoulos et al patent shows how to modify the binarization parameters dynamically, based on local image characteristics, in particular how to dynamically adjust certain parameters on the fly, so to speak, as a function of the local contrast. While the binarization algorithm improves the quality of black and white images, it tends to lose importance, when applied to grayscale images. The current invention extends the binary version into the grayscale arena and inherits much of the advantages of its binary ancestor.

Grayscale images are characterized by the data value being represented by a more-than-one bit binary number, usually an eight bit binary number having a range corresponding to the numbers 0–255. Other ranges are known for digitizing the grayscale, most commonly based on binary numbers of 4 and 16 bits, comprising ranges of 0–15 and 0–65,535, respectively. The invention disclosed and claimed includes all means of representing the gray scale known in the art.

For this application and without loss of generality, 0 is considered black and 255 white with the intermediate values representing slowly changing gradations of gray between black and white. Obviously, the data value could also represent other measurable characteristics, such as transmittance, or variables found in colors, e.g., hue, saturation, and intensity.

2. Description of Related Art

Of the other patentees who have addressed the problem of grayscale enhancement, representative are U.S. Pat. No. 4,724,544 to Matsumoto, U.S. Pat. No. 5,271,064 to Dhawan et al, and U.S. Pat. No. 5,710,840 to Hideshima et al.

Matsumoto surveys the scanned pixel array with a square window having an odd number of pixels per side. The grayscale value of the center pixel is corrected in accord with the result of an algorithm which, essentially, multiplies the pixel information of the center pixel by the square of the size of the matrix array and subtracts therefrom the sum of the pixel information of all of the surrounding pixels in the window. Noise is suppressed by removing the lower order bits of the surrounding pixels prior to adding them together. The sharpness or smoothness of the image is said to be enhanced by the process.

Dhawan et al. examine an adaptive window surrounding the center pixel and use two masks, a smoothing mask and a sharpening mask, to determine whether the central pixel belongs to an edge and must be enhanced or to a uniform image area and must be smoothed. The determination of whether the central pixel belongs to an edge or not is performed by adding its differences from the surrounding pixels and comparing this value to a threshold. In order to determine if the central pixel belongs to a uniform area, a different pattern of gradient vectors is used. Multiple passes are required to complete the enhancement process.

In Hideshima et al. the surrounding pixels are subtracted from the central pixel and the differences summed. The adjustment in value of the central pixel is effected by multiplying that sum by a constant and adding the computed value to the original pixel.

The invention described here differs from the Dhawan et al. and the Hideshima et al. inventions in that only one window is used for comparisons, and the differences from surrounding pixels are individually compared to a threshold (sensitivity S) before being used to determine the enhancement factor. This difference is significant as it prevents small differences between the central pixel and surrounding pixels to accumulate and erroneously be interpreted as an edge.

OBJECTS AND SUMMARY OF THE INVENTION

The present invention provides a method and apparatus for selectively enhancing grayscale images.

A principal object of the invention is to provide a means for sharpening a grayscale image without at the same time enhancing the noise therein.

Another object of the invention is to provide a method for enhancing a grayscale image by selectively limiting the enhancement to significant changes in the image, e.g., at an edge.

Another object of the invention is to provide a method for enhancing a grayscale image in which the operator has the ability to choose which changes are considered significant.

Another object of the invention is to provide a method for selectively enhancing just one side of an edge in which either the black side or the white side may be sharpened.

Another object of the invention is to provide a method for enhancing a grayscale image by means of a grayscale sharpening algorithm adaptable to the particular needs of different parts of the image to provide adequate sharpening for low contrast portions of the image without oversharpening high contrast portions.

Another object of the invention is to provide a method for enhancing a grayscale image in which the grayscale sharpening algorithm is automatically adaptable to the particular needs of the image.

The present invention accomplishes the above by reading a digitized grayscale image into an electronic processing system where a convolution window compares the central pixel with its neighboring pixels. If the difference vector is greater than a preselected, or automatically calculated, threshold, the vector is counted as a significant black vector or significant white vector, depending, respectively, on whether the central pixel is darker or lighter than the neighboring pixel. The central pixel is replaced with an enhanced value, if it is surrounded by a majority of significant lighter or darker pixels.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DETAILED DESCRIPTION OF THE PREFERRED EMBODIMENT

Figure 1:
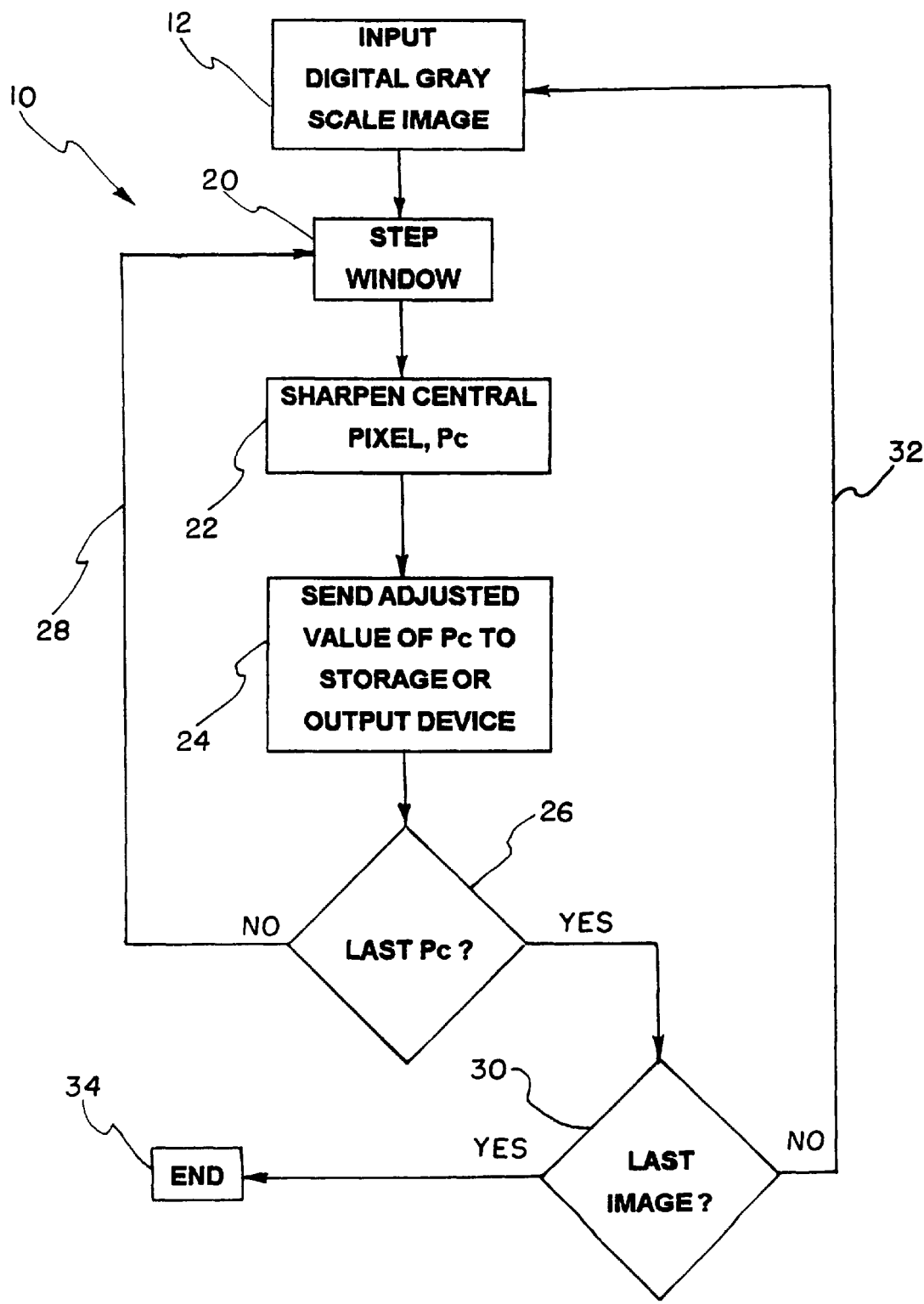
FIG. 1 is a flow diagram which illustrates an overview of the preferred embodiment of the inventive process for sharpening a grayscale image.

Process 10 is illustrated in the flow diagram of FIG. 1, by means of which the invention sharpens a digitized grayscale image. The following description of process 10 follows the data signals through the processing system comprising hardware and software. Prior to effecting the process, the system must, of course, be initialized, e.g., by choosing constants used in the processing algorithm, resetting counters, etc. The initializing steps are mentioned below as appropriate.

Process 10 begins with the entrance of an image 12 of an original digital grayscale image (not shown) into the processing system. Image 12 is not an actual grayscale image but rather comprises a set of electrical signals having values corresponding to the relative intensities of the grayscale values of the matrix of pixels which make up the original grayscale image. For convenience, as is customary in the art, the set of electrical signals is referred to herein and in the claims as a digital grayscale image made up of pixels, even though it is clear the set of electrical signals does not exist as an image per se until displayed by an appropriate means.

For illustrative purposes, each electrical signal is considered to be an eight bit binary number having a value within the range of 0–255 inclusive with binary 0 corresponding to absolute black, binary 255 corresponding to pure white, and the intermediate binary values corresponding to the levels of the slowly changing gradations of gray between black and white. This assignation is strictly for purposes of description. Digital 0 could as well represent white and digital 255 represent black. Both conventions are well known in the art. The electrical signals are preferably stored in an electronic memory, so that the values thereof can be easily accessed and manipulated. It is these digitized signals which the system effecting process 10 handles in sharpening grayscale image 12.

The process disclosed hereinafter is also applicable to color images comprising pixels with three values for Red, Green, and Blue. Transformation equations for transforming color images into grayscale images and vice versa are well known. For example, each pixel in a color image has three values: R for Red, G for Green, and B for Blue. This constitutes what is usually called an RGB image. Each value indicates the intensity of each color. It is known that from these values, an equivalent grayscale image can be generated by applying transformation equations, such as:

Luminance:

$$Y=0299R+0.587G+0.114B$$

$$I=0.596R-0.274G-0.322B$$

$$Q=0.211R-0.523G+0.312B$$

For every color pixel, a grayscale equivalent can be obtained using the Luminance equations shown above. Once a color image has been transformed into a grayscale image, process 10 is applied thereto to sharpen the image, after which the YIQ image is transformed back into an RGB image by means of the following equations:

$$R=1.000Y+0.956I+0.621Q$$

$$G=1.000Y=0.272I-0.647Q$$

$$B=1.000Y-1.106I+1.703Q$$

Other transformation equations are known. The equations given above are exemplary and are non-limiting. Applying process 10 to color transformations are within the purview of the claimed invention.

The source of image 12 is of no critical importance to the invention. The image may be the result of an optical scanner scanning a printed page or photograph, of a photoelectric reading of a positive or negative film, such as an X-ray film, or of the sequential signals from a suitable video source. Examples of useful input sources can be found in the following publications (all incorporated herein by reference): Rafael C. Gonzalez, Paul Wintz, "Digital Image Processing", Addison-Wesley Publishing Company, $2^{nd}$ Edition, ISBN 0-201-11026-1; John C. Russ, "The Image Processing Handbook", CRC Press, 1992 ISBN 0-8493-4233-3; U.S. Pat. No. 4,827,533 to Tanaka; and U.S. Pat. No. 4,853,970 to Ott et al..

Figure 2:
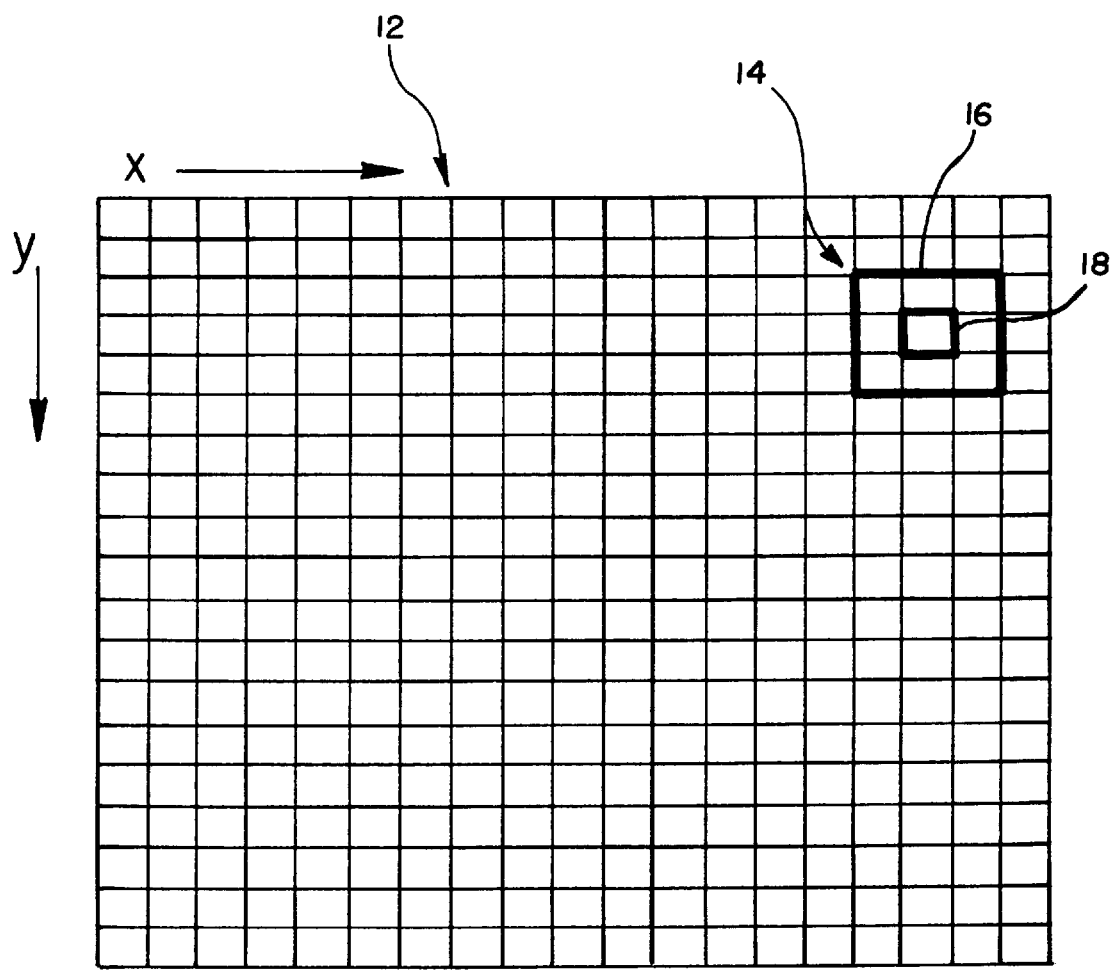
FIG. 2 is a general, diagrammatic illustration of a grayscale image and a 3×3 (3 by 3) convolution window traversing same.

FIG. 2 shows a schematic representation of a digital grayscale image 12 as it is electronically stored in the memory. FIG. 2 comprises a matrix of cells, each of which represents a pixel from the original image. Each cell, in reality an electronic memory cell, has therein one of the eight bit binary numbers which represents a grayscale intensity. These are the values which are compared and modified by process 10.

Figure 4:
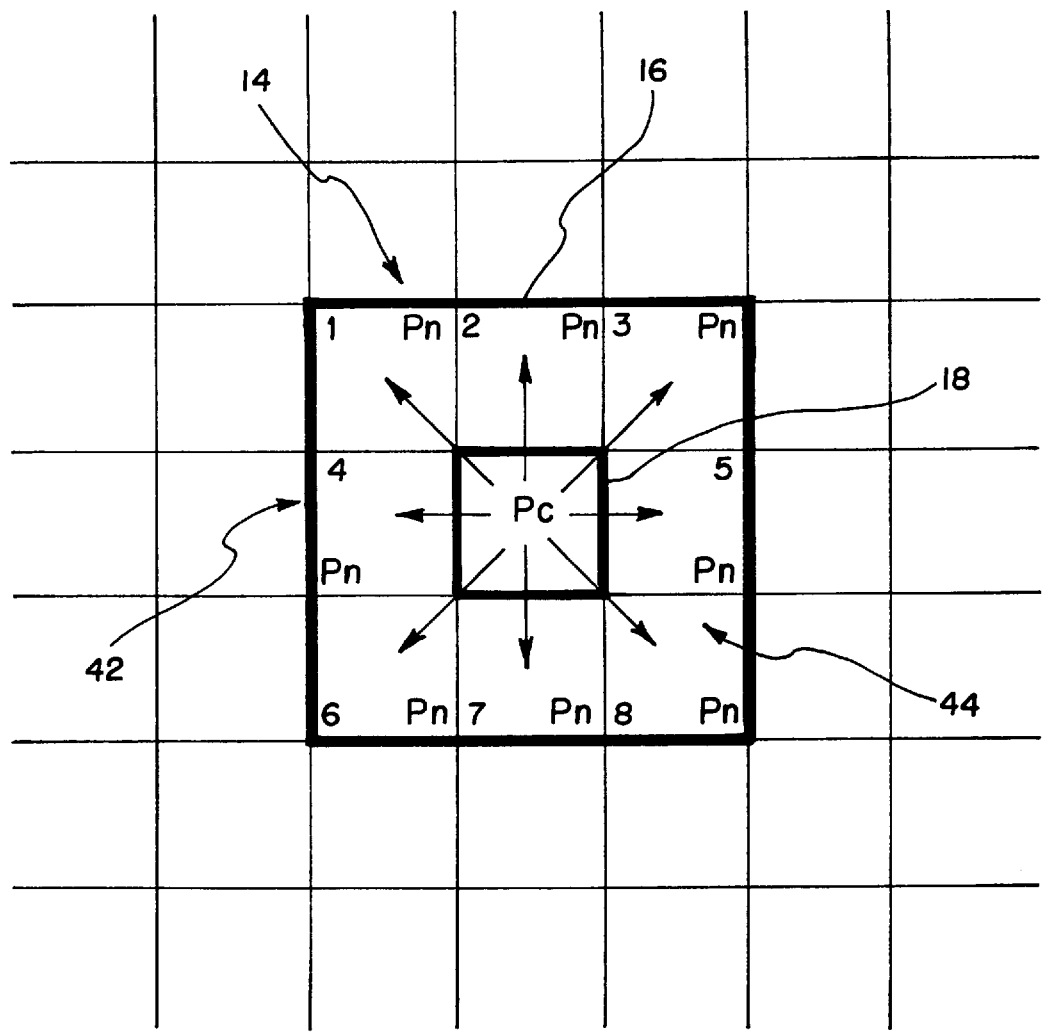
FIG. 4 is a close-up of the preferred sampling pattern for the 3×3 window of FIG. 2 showing details of the neighborhood.

An electronically implemented convolution window 14 is applied to grayscale image 12. Window 14 is a square matrix having an odd number of cells per side, inclusive of an odd number of pixels. Each window 14 in FIGS. 2, 4, and 6–7 is diagrammatically indicated by a darkened, square perimeter 16. In FIG. 2, an overview of window 14 traversing image 12, window 14 is shown as a 3×3 matrix. FIG. 4 shows a close-up view of window 14. FIGS. 6 and 7A–7C show windows encompassing 5×5 and 7×7 matrices, respectively. Being an odd numbered matrix guarantees the presence of a unique central pixel Pc. Central pixel Pc, emphasized by surrounding its cell with darker line 18, is the pixel being enhanced in this particular iteration of the process. Initially, window 14 is positioned at the upper left-hand corner of image 12, which is indicated in the Cartesian coordinate system (x,y) as (1,1). After the enhancement of each central pixel Pc, window 14 is stepped sequentially pixel by pixel from left to right and row by row from top to bottom across the entire image. In FIG. 2, window 14 is said to be located at (17,4), the coordinates of the central pixel Pc, after having traversed rows 1–3 and most of row 4. The specific means for realizing window 14 and moving it across digital grayscale image 12 is irrelevant to the invention and may be any one of the systems known in the prior art for effecting the operation. For examples of techniques for creating and utilizing convolution windows, see U.S. Pat. No. 5,703,971, supra; Raymond Offen, "VLSI Image Processing" McGraw-Hill, 1985 ISBN 0-07-047771-X; Morton Nadler, Eric Smith, "Pattern Recognition Engineering" Wiley-Interscience, ISBN 0-471-62293-1; U.S. Pat. No. 4,827,533, supra; and U.S. Pat. No. 4,853,970, supra, all incorporated herein by reference.

Window 14 can be considered as delineating a central pixel Pc and the surrounding neighborhood 16 of pixels Pn. There are eight neighboring pixels Pn of central pixel Pc in FIGS. 2 and 4, twenty-four neighboring pixels Pn of central pixel Pc in FIG. 6, and forty-eight neighboring pixels Pn of central pixel Pc in FIGS. 7A–7C. That is, for an (n×n) window, there are (n*n−1) neighboring pixels Pn, e.g., (7*7−1)=(49−1)=48, in short, the number of pixels in window 14 minus the central pixel Pc. The size of the matrix depicted by window 14 is selected prior to beginning the process during the initialization of the system. Any number of pixels may be included in window 14. Window sizes 3, 5 and 7 are the sizes found most suitable for processing, since they provide a good balance between quality of enhancement, hardware sizes, and processing times.

Although the number of neighboring pixels Pn are fixed by the selection of matrix size, not all neighboring pixels are accessed for comparisons in certain embodiments of process 10, as will become clear later on. In FIG. 4, the pixels accessed are identified by numerals and the label Pn, e.g., (3 Pn), the numerals identifying the sequential order in which the pixels are compared and Pn identifying the pixel as a neighboring pixel. (The order of making the comparisons is in fact irrelevant, since a new central pixel value is not calculated until all of the neighboring pixels Pn have been accessed. The sequential order shown is the natural result of the hardware used.) In FIGS. 6 and 7A–7C, for clarity, just the comparison numerals are shown. Process 10 will be initially described in detail relative to a 3×3 matrix.

Returning to FIG. 1, digital grayscale image 12 is entered into the system and window 14 is stepped at 20 to a designated pixel, the act selecting it as the central pixel Pc. Sharpening step 22 is then performed on neighborhood 16 for that particular central pixel Pc. Sharpening step 22 actually comprises a plurality of steps discussed in detail with reference to FIG. 3 in association with FIG. 4. In general, sharpening step 22 adjusts, if necessary, the grayscale value of central pixel Pc as a function of the values of the neighboring pixels Pn within window 14 in order to enhance its viewability. The convolution algorithm by means of which central pixel Pc is adjusted will be discussed with reference to FIGS. 3 and 5.

If the original value of the central pixel Pc is changed, the new value is designated "PC" in caps to distinguish it from the original value Pc. Whichever value is output from sharpening step 22, original value Pc or enhanced value PC, it is sent at 24 either to an appropriate storage medium as part of a new image for future use, or it is sent directly to an output device for immediate use. Specific storage mediums and output devices are not important for the practice of this invention and can be any known type of electronic, magnetic or optical storage, display device, another electronic device, etc., such as is taught by U.S. Pat. No. 4,827,533, supra.

Process 10 is not recursive. That is, the adjusted value PC of central pixel Pc does not replace its original value in grayscale image 12. The original value of Pc as represented in the digital, electrical signals of original image 12 remains the same as that which was input into the system. Instead, the adjusted value is either stored in a new memory location as part of a new image or is directly used in a real-time application. As such, process 10 is non-destructive of the raw data inherent in image 12, which if replaced could skew the subsequent adjustments of the remaining pixels.

Next, IF statement 26 checks to see if the central pixel just considered was the last Pc. If the previous Pc was not the last one in image 12, control is returned via processing loop 28 to step 20 where window 14 is stepped to the next pixel in sequence, and the adjustment process is repeated for the newly selected Pc. If the previous Pc is the last one in image 12, all of the pixels of the entire grayscale image 12 have been enhanced, and IF statement 30 asks if this was the last image to be processed. If not, control is sent via processing loop 32 to input the next image 12 into the system for processing, a new convolution window 14 is applied thereto, and the process is repeated. If no further image needs enhancing, process 10 is terminated at END 34.

Figure 3:
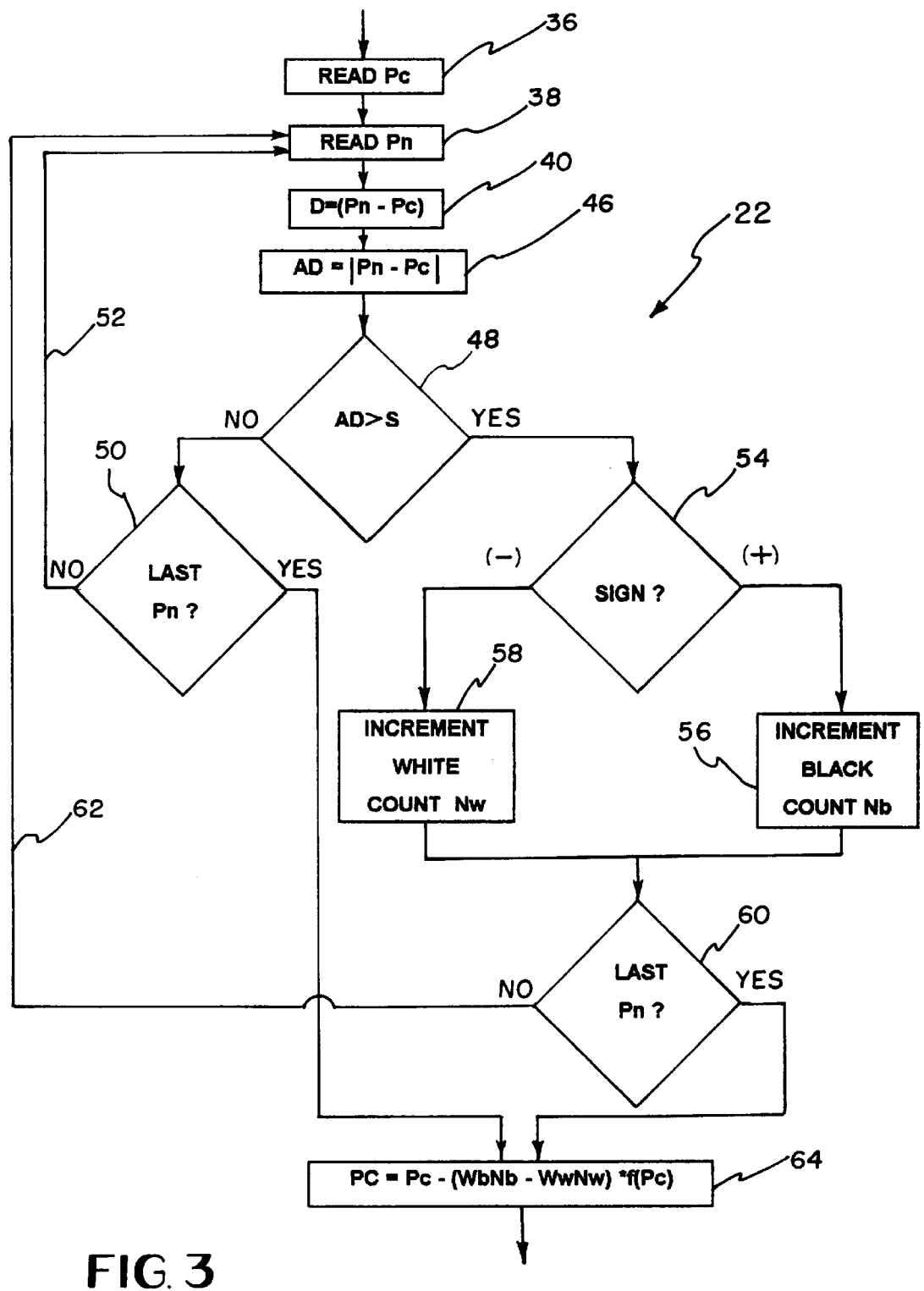
FIG. 3 is a flow diagram illustrating the steps followed in order to analyze a neighborhood of the grayscale image and to adjust, if necessary, the value of the central pixel of the neighborhood.

The details of central pixel sharpening step 22 can be seen most clearly from FIG. 3 in combination with FIG. 4. In the example shown in FIG. 4, an illustrative enlargement of window 14 of FIG. 2, window 14 has been applied to image 12, and several iterations adjusting prior pixels have been performed. Window 14 has just been stepped to the central pixel Pc at (17,4), and the enhancement thereof is ready to begin.

Central pixel Pc is read at 36, and the first neighboring pixel Pn is read at 38. The difference D is calculated at comparison step 40. The order in which the neighboring pixels are compared to the central pixel is irrelevant. In a 3×3 window, all of the neighboring pixels Pn will eventually be compared to central pixel Pc; in higher numbered windows, not all of the pixels enclosed within window 14 are compared. With the hardware currently used, the comparisons are performed sequentially from left to right and top to bottom, i.e., from cell 1 to cell 8, the cell numbers being generally indicated as 42 in FIG. 4. The comparisons are indicated diagrammatically by vectors 44 where the value in the cell in which the tail of the vector originates is subtracted from the value in the cell in which the tip of the vector terminates to give the difference. In the embodiment of FIG. 4, the difference D is (Pn−Pc). The vectors will be identified, as needed, by the cell within which the tip terminates, e.g., when comparing cells 7 and Pc, (Pn−Pc) is (7−Pc) or simply vector 7. These comparisons are made by any of several known circuits designed for the purpose, such as the Texas Instrument 8-bit Magnitude Comparator Integrated Circuit 74866, or the 8-bit Arithmetic Logic Unit 74888. In a microprocessor based design of the invention these comparisons as well as all the operations described herein are implemented as instruction sequences. The comparison gives two pieces of information: one, the value (amount) of the difference which gives an indication of how much of a change in shade has occurred from one pixel to another, and two, the sign of the difference which tells the direction of change. The two are used separately and independently, as will become clear shortly.

The absolute value AD of the difference D is determined at 46. The absolute value is determined, because it is the amount of change which is critical at this stage of process 10. The direction the change in image 12 is taking, indicated by the sign thereof, is of secondary importance. Even though it is the absolute value of (Pn−Pc) which is obtained, the sign of the difference is saved for use later in the process. Circuits are known for finding the absolute value of a difference of two variables without losing the sign. See for example the Asimopoulos et al. U.S. Pat. No. 5,703,971, supra.

IF statement 48 compares absolute value AD to a sensitivity value S. If absolute value AD is equal to or less than sensitivity S, the difference is considered insignificant, and process 10 ignores the information. IF statement 50 then checks to see if Pn is the last neighboring pixel in window 14 to be processed. If not, control is returned via loop 52 to READ step 38, the next Pn is accessed, and process 10 continues. If absolute value AD is greater than sensitivity S, the difference is considered significant and the vector 44 associated therewith is included as a factor in the enhancement process in the manner discussed below.

It should be appreciated that sensitivity S performs several key functions in process 10. It is a threshold which allows only significant changes in images to be enhanced. The corollary of which is that it does not enhance insignificant changes, such as noise, and it leaves unchanged features of which the enhancement would be detrimental to image 12.

Sensitivity S is a parameter which does not allow process 10 to respond to local changes in image 12 due to noise. Noise is almost always present to some degree in every image, being introduced by any of a number of sources, such as imperfections in the image-supporting medium (usually film, paper, or a CRT screen), defects in the initial printing of the image, and static from the electronics used, whether a scanner, an analog-to-digital converter, or the processing system itself. Like all images, the values recorded in image 12 include noise signals superimposed on the signals produced by the significant features of the actual image. The noise signals are usually present as random fluctuations of intensity which are randomly distributed across the surface areas of image 12. Persisting fluctuations in intensities are usually caused by changes in the significant features in the image itself. Many prior art image-sharpening processes enhance noise along with the significant features; although important images features are sharpened thereby, so are the changes due to noise, so the signal-to-noise ratio remains undesirable. The inventive process ignores the noise, enhancing only significant features. The signal-to-noise ratio is improved thereby.

Sensitivity S is also used to leave alone those local changes in image 12 which should not be enhanced. For instance, a picture may gradually change in shade over an extended area, such as from darker shades of a blue sky overhead to lighter shades in the distance. Enhancement of the image could produce sharp, local changes in shade, producing a jerky transition, which would destroy the desirable smoothness inherent in the original image. Sensitivity S prevents desired gradual changes from being altered.

In process 10, sensitivity S defines "significantly". The absolute difference AD surpasses the threshold set by sensitivity S only if the central pixel differs "significantly" from its neighbors, signifying when a feature of image 12 should be enhanced. This occurs only in an area of transition between distinguishable elements of the image, namely, on an edge. An example of the operations of sensitivity S will be discussed relative to the edges of a line in FIG. 5. The operator of process 10 selects the value of sensitivity S at the beginning of the run based upon the nature of the image. If image 12 is low in contrast with only minor changes between discernible features, a low value for sensitivity S will be selected. If image 12 is already high in contrast, and if the operator desires only the most significant edges to be sharpened, a higher value for sensitivity S will be selected. In general, lower values for sensitivity S tend to adjust more, if not all, central pixels, in effect, in response to anything that moves. Higher values are more selective, enhancing only a relatively few pixels, essentially requiring large differences in neighboring pixel values. Intermediate values of S, of course, effect an intermediate number of changes of intermediate value differences. The power of including the sensitivity S in process 10 is readily apparent, for it allows the user to adapt process 10 to the needs of each individual image.

The value of sensitivity S is specified in terms of a number indicating a difference in level of grayscale gradations. For example, a sensitivity value of 50 indicates that to be considered significant, the central pixel Pc must differ by at least 51 gradations in shades from a neighboring pixel Pn.

In the simplest embodiment, sensitivity value S is a constant set during the initialization of the system. In a more advanced embodiment, sensitivity S is dynamically computed in the manner shown in Asimopoulos et al, supra. A non-limiting example of how sensitivity S is dynamically changed occurs in the enhancement of an image having high-contrast portions (e.g., print on a page) and low-contrast portions (a water-mark in another area of the same page). A larger window, not shown, including convolution window 14 therein, would sample each portion of image 12 in turn, determine the minimum and maximum gray shade values in that portion, and set sensitivity S as a percentage of the difference in the local minima/maxima. The print and the water-mark would be enhanced based on its own needs, rather than have a single criterion imposed on both. Both embodiments are within the purview of the claimed invention.

Return to FIG. 3 and consider the situation where absolute value AD is greater than sensitivity S, and the corresponding vector 44 is considered significant.

Neighboring pixel Pn has been compared to central pixel Pc to determine its difference (Pn−Pc). If Pn is greater than Pc, the sign of the difference D is positive (+), and the neighboring pixel is lighter than the central pixel Pc, since lighter pixels have a higher binary value. This vector 44 is called a "black" vector, because Pc (the reference pixel) is blacker than the neighboring pixel Pn under consideration. "Plus" is "black." Conversely, if Pc is greater than Pn, the sign of the difference is negative (−), and the neighboring pixel is darker than the central pixel Pc. This vector 44 is called a "white" vector, because Pc (the reference pixel) is whiter than the neighboring pixel Pn. "Minus" is "white." That is, as one moves from Pc to Pn, if Pn is lighter, vector 44 is black, and if Pn is darker, vector 44 is white. It helps to remember that the color of vector 44 is the same as the central pixel and opposite that of the neighboring pixel.

"Black" and "White" in this context is not a statement that either is actually absolutely black or pure white. Nor is any pixel changed to binary 0 or 1, forcing it to become a black or white pixel as in binarization processes. It merely takes note of whether central pixel Pc is darker or lighter than its neighboring pixel Pn.

It should be noted at this point that the sign of the vector is independent of the direction the vector is pointing. (Obviously, the absolute difference AD of the vector is also independent of the direction of the vector, but that is not the point here.) In Cartesian coordinates, one is accustomed to vectors pointing to the right (or up) to be positive, and those pointing left (or down) to be negative, because "right" and "up" are positive directions in Cartesian coordinate systems. In process 10, however, the sign is determined by which is larger, the central pixel Pc or the neighboring pixel Pn, regardless of whether Pn is located to the left or right of Pc. Thus, vector 5 is positive if Pn>Pc, but so is vector 4, or vector 1, or vector 7. Conversely, any of the vectors are negative regardless of direction if Pn<Pc. That is, the sign of the vector is omni-directional. This is a very important characteristic of process 10, for it allows the enhancement to also be independent of the direction from which window 14 approaches an edge. Thus, the enhancement too is omni-directional, as will be explained more clearly below relative to FIG. 5.

If AD surpasses S, then IF statement 54 checks the sign of the vector to separate the significant black vectors from the significant white vectors. If the sign is positive (+), a black vector is present, and it is recorded by incrementing by one the count Nb of "Black" counting circuit 56. If the sign is negative (−), a white vector is present; this is recorded by incrementing the count Nw of "White" counting circuit 58 by one. At this point, the absolute value AD of the difference is irrelevant, having already served its function of surpassing sensitivity S. When counted as black or white vectors, only the sign of the difference is considered. And, each vector is equal in value when being counted; that is, each have the same value, one, and is not valued proportionately to anything, especially the absolute difference AD. Nb and Nw are digital numbers, 0, 1, 2, 3 . . . which simply count the number of vectors 44 that are determined to be significant. (Nb and Nw are reset to zero when window 14 is stepped to a new Pc.) After the significant vector has been counted, IF statement 60 determines whether or not Pn is the last neighboring pixel in window 14 to be processed. If all the neighboring pixels have not been compared to central pixel Pc, control is returned via loop 62 to step 38 to read the next Pn for comparison to Pc.

Eventually, all of neighboring pixels Pn will have been compared to central pixel Pc. Regardless of whether control last resided in IF statement 50 or in IF statement 60, a new value PC of Pc is calculated by processing unit 64.

Processing unit 64 applies the following algorithm A to calculate the new value PC for the central pixel:

$$PC=Pc-(WbNb-WwNw)*f(Pc) \qquad (A)$$

where:

f(Pc) is a table whose preselected values emphasize selected ranges of Pc values;

Nw is the number of white vectors in which Pc is lighter than the neighboring Pn;

Ww is a weighting factor emphasizing transitions of Pc from lighter to darker pixels;

Nb is the number of black vectors in which Pc is darker than the neighboring Pn;

Wb is a weighting factor emphasizing transitions of Pc from darker to lighter pixels;

(WbNb−WwNw)*f(Pc) comprises an adjustment term for adjusting the value of Pc;

Pc is the original value of Pc; and

PC is the new, enhanced value for Pc.

It should be understood that the steps of multiplying Nw, Nb, and the subtrahend (Nb−Nw) by weighting factors can be accomplished by the setting of constant weighting factors when the system is initialized or dynamically by computing weighting factors during the running of process 10. Both are considered to be included within the purview of the attached claims. Further, the values of the weighting factors includes zero (0) and one (1) for any of them.

In order to get a feel for the functioning of algorithm A, the influence of the modifying factors Ww, Wb, and f(Pc) are eliminated by setting each of them equal to one, that is:

$$Wb=Ww=f(Pc)=1$$

Algorithm A then becomes:

$$PC=Pc-(Nb-Nw) \qquad (B)$$

Algorithm B responds only to the raw data found in image 12, namely, the significant black and white vectors. The subtrahend (Nb−Nw) compares the number of significant black vectors to the number of significant white vectors. As such, it gives an indication of whether Pc is surrounded by predominantly lighter pixels, predominantly darker pixels, or a substantially equal number of lighter and darker pixels. The manner in which algorithms A and B function will be made clearer by reference to FIG. 5.

Figure 5:
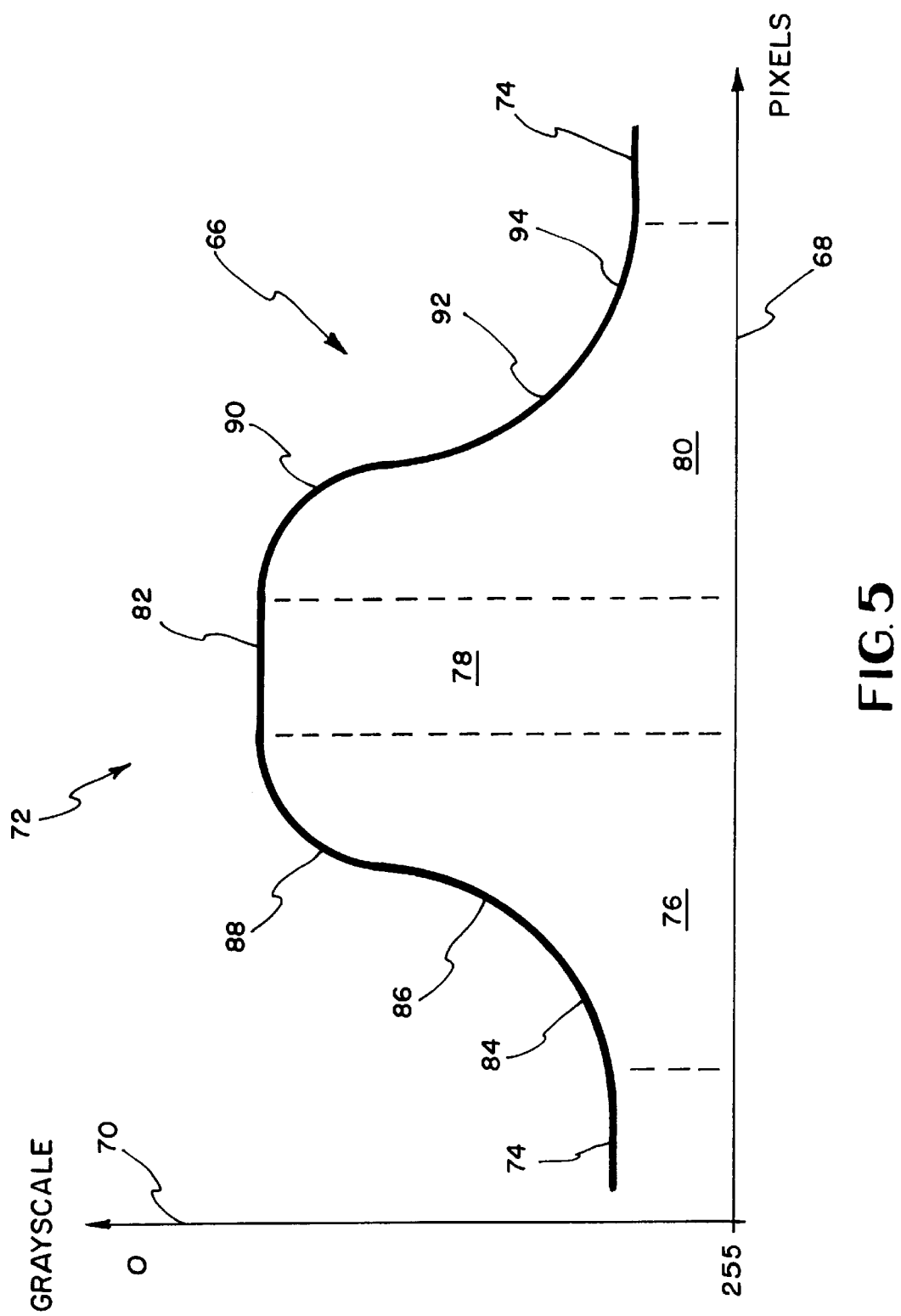
FIG. 5 shows a grayscale representation of a cross-section of a line for use in describing the inventive process.

FIG. 5 shows a graph or curve 66 of the pixel values of a cross-section of a portion of an image 12 with the abscissa 68 corresponding to sequential pixels within a single row as window 14 steps across the image from left to right and with the ordinate 70 corresponding to the grayscale values of the pixels encountered.

A cross-section of a dark line 72 is depicted. Line 72 is flanked by a light background 74 on both sides of line 72. Background 74 is rarely pure white, so it is shown as having a value less than 255, even though nothing is printed there. Line 72 comprises a leading edge 76, a main body 78, and a trailing edge 80. When an edge is encountered in an image, the gradient between the light background and darkest part of the main body is not usually a step function, i.e., a sharp, vertical drop from a higher grayscale value to a lower one. Rather it is evidenced as a more-or-less steep S-shaped curve whose pixel values decrease relatively quickly over an extended number of pixels, before it levels off at top 82 of main body 78. On the other side of the main body, the pixel values of trailing edge 80 rise relatively quickly along another S-shaped curve, probably not a mirror image of the leading edge. In FIG. 5, leading edge 76 of line 72 has a lower portion 84, a middle portion 86, and an upper portion 88 which merges into flat top 82 of the main body 78. On the other side of line 72, top 82 merges into the upper portion 90 of trailing edge 80, followed by a middle portion 92 and a lower portion 94 before tailing off into background 74. Lower portions 84 and 94 are the transition regions between the "white" background and the line, the so-called "white edges"; they are characterized by having counter-clockwise rotating slopes. Conversely, upper portions 88 and 90 are the transition regions between the "black" line and the following background, the so-called "black edges"; they are characterized by having clockwise rotating slopes. Middle portions 86 and 92 include the inflection points where counter-clockwise rotating slopes and vice versa, respectively change to clockwise rotating slopes.

For the purposes of this initial discussion, it is sufficient to consider line 72 as extending substantially vertically on the page, i.e., North-South relative to window 14 of FIG. 4. Other orientations will be considered shortly.

As the 3×3 window 14 of FIG. 4 approaches line 72, all of the pixels therein are background pixels 74. Ideally, there will be no differences D in value between central pixel Pc and any of its neighboring pixels Pn, so no absolute values AD will pass sensitivity S, no significant vectors will be counted, and central pixel Pc will not be changed by algorithms A or B. In the real world, a reasonable sensitivity S will have been selected with an eye toward suppressing small differences due to noise, i.e., the absolute values AD of small differences will be suppressed by sensitivity S.

As window 14 begins to encounter line 72, the pixels of lower portion 84 of leading edge 76 begin to show up as the neighboring pixels 3, 5, and 8, and the vectors corresponding thereto will increase in value. Initially, sensitivity S will continue to suppress vectors 3, 5, and 8, but as window 14 continues to move further to the right along the row, the pixel values will rapidly drop along lower portion 84, and significant vectors will be generated and counted. Vectors 3, 5, and 8 will be counted as white vectors Nw, since the difference D will be negative, because each of pixels 3, 5, and 8 has a lower value than central pixel Pc. That the vectors are white is confirmed perceptually by noting that central pixel Pc, residing in the area to the left of neighboring pixels 3, 5, and 8, is still part of the lighter background 74. Vectors 1–2, 4, and 6–7 will still be suppressed by sensitivity S, so only white vectors corresponding to pixels 3, 5, and 8 will be counted. Pc will be increased in value by algorithms A or B due to the superiority in the number of white vectors Nw, so the new central pixel PC will be driven whiter. The central pixels Pc will continue to be replaced with whiter pixels during successive iterations of enhancement so long as vectors 3, 5, and 8 pass sensitivity S while vectors 1–2, 4, and 6–7 do not. The result is that the pixels of lower section 84 will be made whiter, flattening out the slope of the initial portion of edge 76. This is characteristic of counter-clockwise rotating slopes. Edge 76 is thereby sharpened.

As window 14 traverses middle section 86 of edge 76, the slope of the curve becomes steep enough on both sides of central pixel Pc to generate significant vectors when Pc is compared with pixels 1, 4, and 6 as well as with pixels 3, 5, and 8. Pixels 2 and 7 are equal to Pc, because line 72 has been assumed to be vertical. When this occurs, however, an equal number of white vectors Nw (vectors 3, 5, and 8) will be offset by an equal number of black vectors (vectors 1, 4, and 6), so algorithms A or B will not enhance central pixel Pc. This portion of edge 76 is sharp enough not to need enhancing.

During traversal of upper portion 88 by window 14, the flattening of the curve as it approaches the top 82 of main body 78 of line 72 causes the differences in pixel values for the leading vectors 3, 5, and 8 to diminish sufficiently for sensitivity S to suppress them, while the trailing vectors 1, 4, and 6 will continue to generate black vectors. The result is that the value of Pc will be dropped, and the dark pixels in upper portion 88 will be replaced with even darker pixels. This is characteristic of clockwise rotating slopes. This corner of edge 76 will be sharpened thereby.

Continuing along the row of pixels represented by abscissa 68, window 14 traverses top 82 of line 72. Just as in background 74, the pixels surrounding central pixel Pc are equal to the central pixel, so Pc, once again, does not change.

The effects of process 10 on edge 80 is the same as that for edge 76 but reversed relative to window 14. That is, as window 14 leaves top 82, the leading vectors 3, 5, and 8 increase in absolute value AD enough to pass sensitivity S before the trailing vectors 1, 4, and 6 do. Inasmuch as central pixel Pc is darker than pixels 3, 5, and 8, the vectors generated are black vectors. The upper portion 90 of edge 80 is driven blacker, therefore, and that corner is made sharper. The large absolute values produced by the steep slope of middle portion 92 result in an equal number of black and white significant vectors, which off-set each other in the subtrahend (Nb−Nw), and again, the central pixels Pc under consideration are not changed by algorithms A or B. In lower portion 94, the flattening of curve 66 as it approaches the flat background 74 reduces the absolute differences AD of vectors 3, 5, and 8 below the level of sensitivity S, while vectors 1, 4, and 6 still have absolute differences large enough to pass sensitivity S. White vectors are generated which drives the central pixels whiter. Eventually, as window 14 begins to leave line 72, the pixels of lower portion 94 of trailing edge 80 are the only neighboring pixels in window 14, but unlike the situation when window 14 was encountering line 72, instead of line 72 occupying pixels 3, 5, and 8, line 72 now occupies pixels 1, 4, and 6. The result is the same, however, the pixels in lower portion 94 will be driven whiter, again sharpening the corner.

The aforementioned omni-directionality of window 14 is readily apparent in the example just given of window 14 being stepped through line 72. It does not matter whether window 14 is approaching line 72 or leaving line 72, only three pixels of line 72 are sensed by window 14. When approaching, pixels 3, 5, and 8 of window 14 are a part of lower portion 84, and being the only vectors in window 14 with absolute differences AD greater than sensitivity S, they generate three significant vectors. When leaving, pixels 1, 4, and 6 of window 14 are a part of lower portion 90, and their absolute differences also are the only ones sufficient to generate three significant vectors. Both sets are white vectors, since the central pixels in both are lighter than the pixels productive of the vectors being counted. Being the only significant vectors counted, algorithm B alters both central pixels Pc by driving them lighter. That is, if the absolute differences surpass sensitivity S and the signs are the same, process 10 produces the same effects, regardless of the location of the significant vectors in window 14. This is due to the independence of both the absolute differences AD and the sign of the vector to the location of the contributing pixel Pn relative to the central pixel Pc in window 14.

The absolute difference AD of the significant vectors is independent of the direction of the vector in window 14. When comparing the absolute difference AD with sensitivity S, window 14 and thereby process 10 cannot differentiate between vectors 3, 5, and 8 and vectors 1, 4, and 6. In fact, process 10 cannot determine which of vectors 1–8 is being compared to the sensitivity. They are as indistinguishable as rain-drops. Consequently, regardless of which pixels of neighborhood 16 are sensing an edge such as line 72, the same number of significant vectors will be produced by the same degree of incursion of window 14 into line 72.

Also, the sign of the vector generated is independent of the location of the neighboring pixel in window 14. The value of the central pixel Pc is always subtracted from that of the neighboring pixel Pn. (Pn−Pc) indicates by its sign whether or not the central pixel is lighter or darker than the neighboring pixel but not their relative orientation in window 14 or in image 12. So, when it is counted as a black or white vector, the count is likewise independent of location in window 14. It follows that algorithms A and/or B enhance the central pixel independent of the orientations of the significant vectors relative thereto. It does not matter whether the significant pixels Pn are to the right, left, above, below, or diagonal relative to central pixel Pc, if Pn<Pc or Pn>Pc, the same number of significant vectors will be counted, and the central pixel is adjusted to the same degree. Each central pixel is individually adjusted based upon the number of significant vectors in its immediate neighborhood, regardless of the relative orientation of window 14 to the edge being sensed. Whether the edge is located to the right, left, above, below, or diagonal relative to central pixel Pc, the same results are produced, namely, when the central pixel Pc is near the lighter part of the edge (lower portions 82 and 94, above), its value is made lighter (in this case larger), while when it resides near the dark side of an edge (upper portions 86 and 90, above), then its value is made darker (in this case smaller). The operative neighboring pixels Pn will change based on the window-to-edge orientation, but since process 10 is omni-directional, the results are the same.

In the detailed example above of a vertical edge, the operative pixels were pixels 3, 5, and 8, when window 14 was approaching an edge, and pixels 1, 4, and 6 when window 14 was leaving an edge. The results were the same, however, for other edge orientations. Should window 14 be running alongside a horizontal edge such that the edge only overlaps pixels 1, 2, and 3, (or pixels 6, 7, and 8) the same results will occur, three white vectors will be generated, and the pixels along the edge will be driven whiter. An obvious extension occurs when window 14 encounters an edge extending at an angle relative to window 14, such as from upper left to lower right. In that case, the first pixels to encounter the edge will be pixels 3, 2, and 5. With the same three white significant vectors being the only ones generated, algorithm B will produce the same results. When the edge intersects window 14 diagonally from above right to below left, pixels 8, 5, and 7 become the operative three pixels, again with the same results. Being omni-directional, having the ability to enhance an edge in a predictable and consistent manner, regardless of where and how encountered, process 10 has proven itself to be a superior performer in the art.

The smooth curve of FIG. 5 has been treated as if it were a depiction of an ideal image, devoid of the effects of noise. In actuality, curve 66 will be saw-toothed over virtually its entire length, as the random fluctuations in pixel values produced by noise are superimposed thereon. The changes of pixel values due to noise will also be sensed, when window 14 samples the area, but sensitivity S acts to suppress enhancement by ignoring their small differences.

The enhancement of image 12 permitted by the 3×3 window of FIG. 4 is minimal inasmuch as only neighboring pixels Pn which are immediately adjacent the selected central pixel Pc are compared therewith. Only small changes are occurring at such a limited distance, as can be seen from FIG. 5, where adjacent pixels seemingly differ very little. The major differences in grayscale values are usually apparent only across a plurality of pixels. The windows of FIGS. 6 and 7A–7C permit a broader coverage of image 12 in each iteration of sharpening step 22.

FIGS. 6 and 7A–7C illustrate 5×5 and 7×7 convolution windows 14, respectively. The 3×3 window previously described is useful for descriptive purposes, for it is simple enough to admit of easy analysis. In actuality, the 5×5 and 7×7 convolution windows are the ones most commonly used by the inventors, for they allow a more accurate enhancement of central pixel Pc, due to the inclusion of more neighboring pixels into algorithms A or B and the utilization of vectors that span three image pixels rather than two. This lengthening of the comparison vectors, enables a more robust detection of image edges, as it requires a more constant change of the slope, compared to a 3×3 window.

In addition, providing a broader reach allows central pixel Pc a better look at the surrounding terrain, for the larger the convolution window, the more comprehensive is the picture of the local scene in image 12. Vectors which may have been skewed by unwanted fluctuations due to noise are averaged into a larger number of comparisons, and therefore, are not as influential as they would be in the 3×3 window 14 of FIG. 4.

Figure 6:
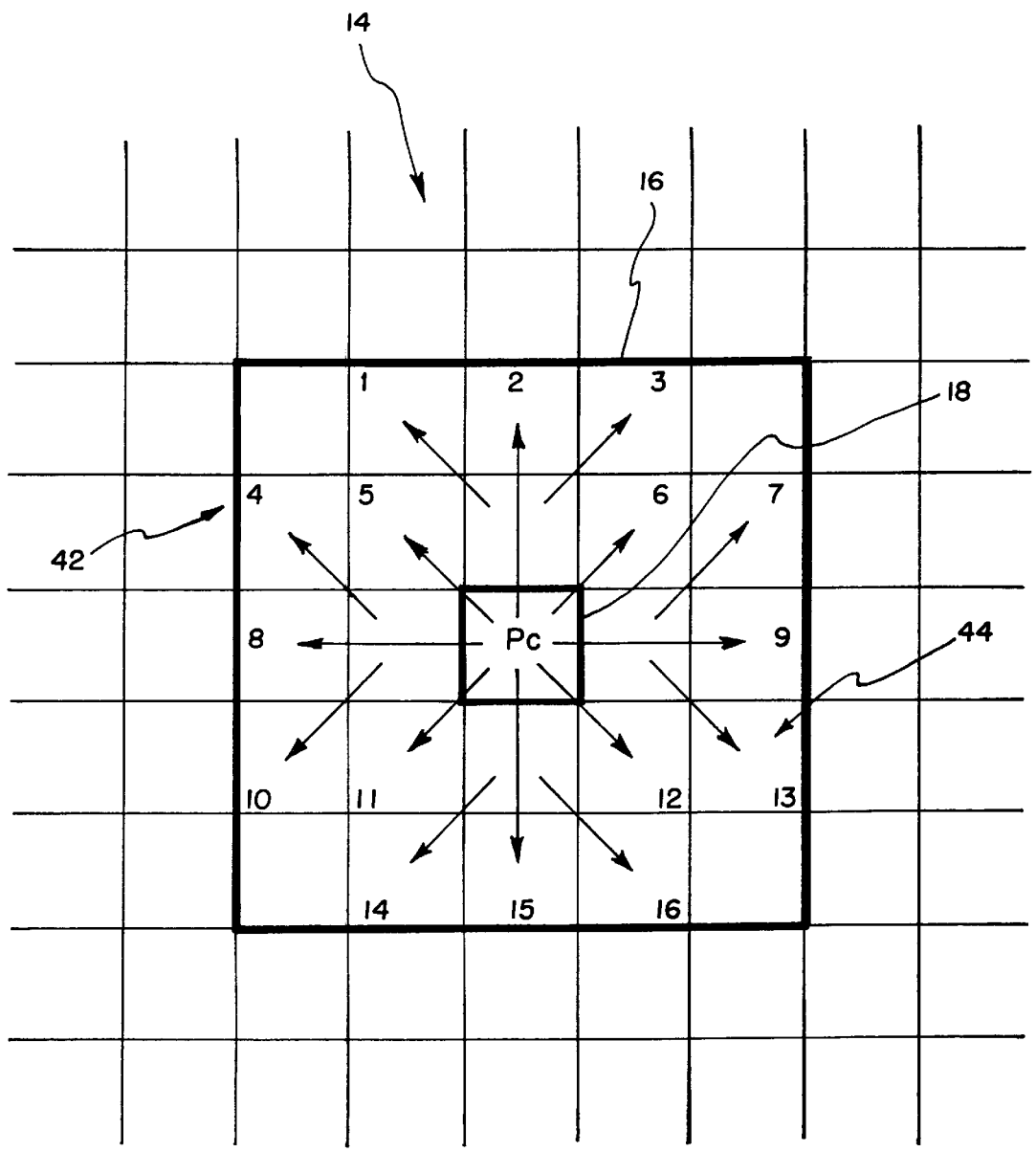
FIG. 6 is a close-up of the preferred sampling pattern for a 5×5 convolution window showing details of the neighborhood.

An important difference between 5×5 and 7×7 windows compared to a 3×3 window is some pixels are compared with other neighboring pixels Pn instead of central pixel Pc. For example, pixels 1, 3, 4, 7, 10, 13, 14, and 16 of FIG. 6 are compared to diagonally oriented neighboring pixels. This is a very significant feature of the invention, as it enables widening of the area near an edge that will be enhanced. For example, referring to FIG. 5, while a 3×3 window moving from West to East can enhance an image pixel only when the central pixel Pc is on an edge, the 7×7 window of FIG. 7A can start the enhancement when vector 18 approaches an edge, and continue when vector 17 approaches the edge. This expansion of the sampling area generates better defined and thicker edges, which can be very useful in subsequent processes using an enhanced image 12, such as Optical Character Recognition (OCR).

FIGS. 6, 7A, 7B and 7C show some preferred vector configurations that have been tested and produce "good" results, that is, well defined enhanced edges, minimal noise in flat image areas, and uniform enhancement along all directions.

Of course, the flow diagram of FIG. 3 will have to be modified for the sampling patterns of FIGS. 6, 7A, 7B and 7C to take into account that some neighboring pixels Pn are compared to other neighboring pixels instead of central pixel Pc. For example, the difference D and absolute difference AD will be calculated according to the following equations:

$$D = (Pn_1 - Pn_2)$$

$$AD = |Pn_1 - Pn_2|$$

where $Pn_1$ is the neighboring pixel associated with the head of the vector and $Pn_2$ is the neighboring pixel associated with the tail of the vector, although $Pn_2$ will be Pc where appropriate. The first of the two pixels selected for comparison is $Pn_1$, and as can be seen in FIGS. 6 and 7A–7C, the head $Pn_1$ is associated with a single, unique tail $Pn_2$. It is a simple programming task to insure that the software automatically selects the proper neighboring pixel.

Figure 7A:
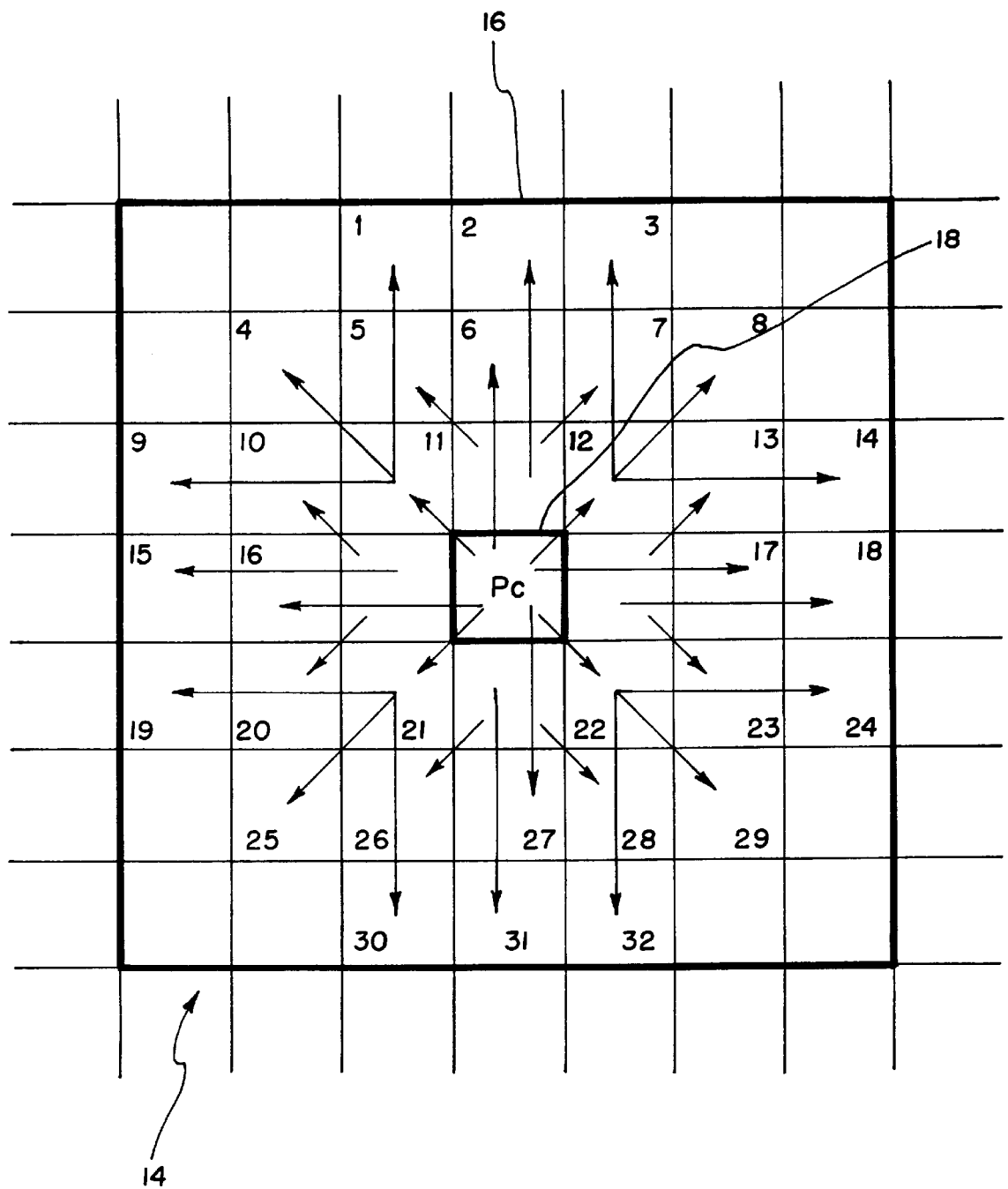
FIG. 7A is a close-up of the preferred sampling pattern for a 7×7 convolution window showing details of the neighborhood.
Figure 7B:
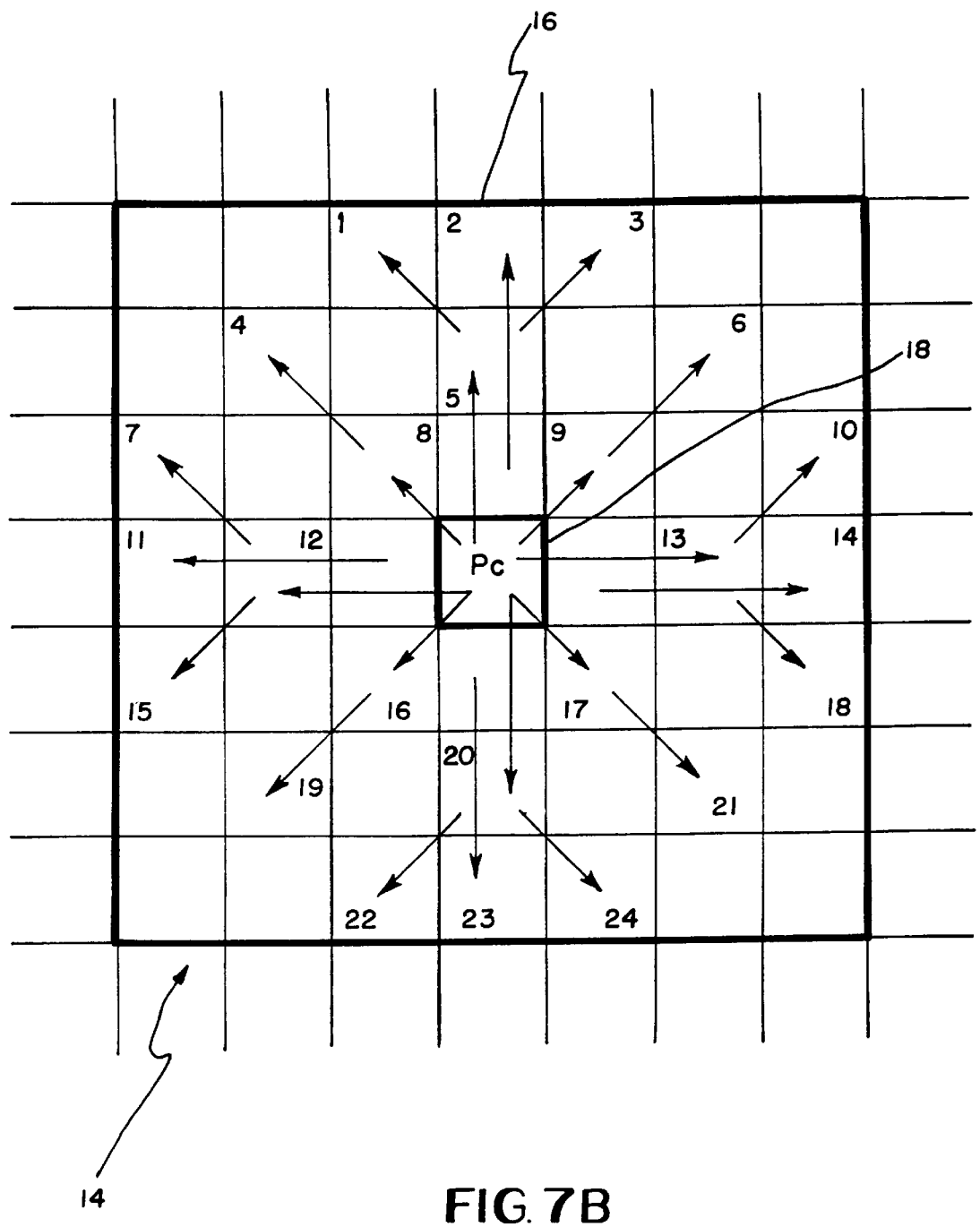
FIGS. 7B–7C show other sampling patterns for 7×7 convolution windows.
Figure 7C:
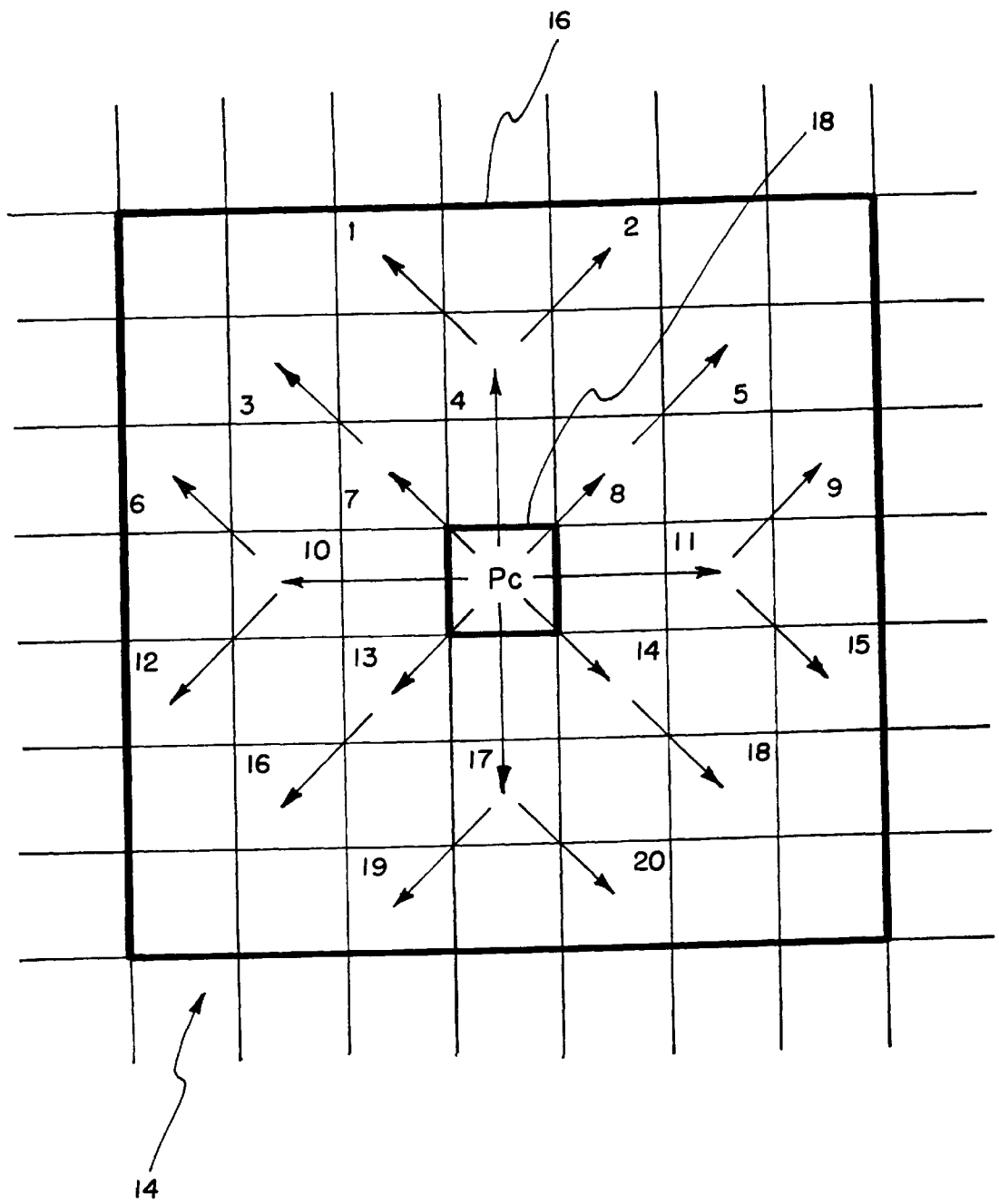

It can easily be seen from a comparison of FIGS. 7A, 7B, and 7C, that a different number of neighboring pixels is utilized in each, namely, 32, 24, and 20, respectively. This permits selection of different degrees of saturation of the neighborhood in the comparison process. Obviously, the more comparisons made prior to calculating a new PC, the more comprehensive the enhancement. The price, of course, is hardware size and/or operating speed. The sampling patterns disclosed are those found to strike a workable balance between the operating parameters. Those given here are the preferred, but it is apparent that other sampling patterns can be devised which strike whatever balance is desired between speed and saturation.

The effects of the weighting factors Wb, Ww, and f(Pc) will now be considered.

Wb and Ww are preselected weighting factors for allowing selective enhancement of edges. As was just seen in FIG.

5, an edge in an image has a steep slope with oppositely curved portions at each end that are S-shaped. Existing sharpening algorithms sharpen both ends of the slope; see U.S. Pat. Nos. 5,271,064 and 5,710,840, supra, for example. It is often desirable, however, to enhance one side of a gradient more than the other. This is the case when a flatter, less sharp background is needed to reduce compressed image sizes or just to create images that are visually more pleasant. Process 10 can be tailored to sharpen either end of the slope, the lower or the upper, independently of the other by proper selection of weighting factors Wb and Ww. In order to achieve that, the values of the weights (Ww or Wb) are usually different. Setting one of the weights to zero, for instance, results in enhancing only one side of the edge. By considering a few sample values of Wb and Ww, the results can easily be seen. Again assume the value of f(Pc) is one.

Set Ww equal to zero. All of the significant white vectors are eliminated from algorithm A, and algorithm A reduces to $$PC = Pc - WbNb$$

Regardless of the value of Wb, if there are any significant black vectors present in window 14, Pc will be diminished and made proportionately darker. Since only significant black vectors will be effective, only the darker side of an edge will be sharpened but not the lighter side, extending the transition from light to dark into the edge. That is, only upper portions 88 and 90 in the example above, will be made darker, which can eliminate the sometimes undesirable white halos around a dark region that can be produced by other sharpening methods.

Setting Wb to zero achieves the opposite. By eliminating the significant black vectors, only the lighter pixels are enhanced. It can readily be seen that various combinations of non-zero values for Ww and Wb will emphasize the white significant vectors or the black ones, respectively, to any degree desired.

Weighting factors Wb and Ww can be preselected constants, or they can be made to depend upon the sensitivity S and/or upon the value of central pixel Pc. For example, Wb and Ww can be defined as follows:

$$Wb = b \times S$$

$$Ww = w \times S$$

where b and w are constant scaling factors. If sensitivity S is not itself a preselected constant but is instead dynamically calculated as shown in Asimopoulos et al, supra, then it follows that the weighting factors Wb and Ww will also be constantly adjusted to the local characteristics of the image, since they are functions of S. This feature allows the process 10 to be further refined for its task of suppressing noise and enhancing only those pixels which meet the requirements specified by the functions for computing Wb and Ww.

Weighting factor f(Pc) allows adjustment of the weights as a function of the actual grayscale value of the central pixel Pc. Its values are selected dependent on how image 12 is to be sharpened. For example, if greater sharpening of darker pixel values is desired to further emphasize darker features, e.g., the lower half of the spectrum, the table values could be selected as follows:

$$f(Pc) = 2 \text{ if } Pc > 127$$

$$f(Pc) = 1 \text{ if } Pc < 128$$

Any range or ranges of shades can be selected for emphasis, and the data provided in the table allows the algorithm to give special emphasis to the particular ranges of interest.

It is clear from the above that the objects of the invention have been fulfilled.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is it intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

We claim:

1. A process for enhancing a digital grayscale image, comprising the steps of:

(a) selecting a digital grayscale image, said image comprising a matrix of pixels, each of which has a characteristic grayscale value associated therewith;

(b) applying a convolution window to said image, said convolution window having an odd number of pixels therein including a central pixel Pc and neighboring pixels Pn;

(c) identifying the central pixel within said convolution window;

(d) comparing the characteristic grayscale values of a plurality of selected pairs of pixels within said convolution window, said comparing step for each selected pair of pixels yielding a vector comprising an indication of the magnitude of the change in value between said selected pair of pixels and an indication of the direction of said change in value;

(e) comparing said magnitude of each said selected pair of pixels to a threshold value, and if said magnitude is less than or equal to said threshold value, selecting the next of said selected pairs of pixels within said convolution window, and repeating steps (c) through (e), until all of the selected pairs in said convolution window have been compared and thereupon, proceeding to step (h); however (f) if said magnitude is more than said threshold value, counting the number of each of said vectors whose magnitudes have surpassed said threshold value;

(g) repeating steps (c) through (f), until all of the selected pairs in said convolution window have been compared;

(h) adjusting the grayscale value of said central pixel as a function of the number of vectors counted;

(i) outputting the adjusted value of said central pixel; and (j) stepping said convolution window to the next pixel, and repeating steps (c) through (j), until all the pixels of said image have been processed as central pixels.

2. The enhancing process of claim 1 wherein said step of comparing each selected pair of pixels comprises the steps of selecting a first pixel and a second pixel, said first pixel being closer to the center of said convolution window than said second pixel, subtracting the grayscale value of said first pixel from the grayscale value of said second pixel to obtain a difference in grayscale values therebetween with sign, and finding the absolute value of said difference, said sign of said difference comprising said indication of said direction of change and said absolute value comprising said indication of said magnitude of change.

3. The enhancing process of claim 2 wherein said first pixel comprises said central pixel.

4. The enhancing process of claim 2 wherein said step of counting the number of vectors comprises forming a positive sum by counting the number of vectors having positive signs and separately forming a negative sum by counting the number of vectors having negative signs.

5. The enhancing process of claim 4 wherein said step of adjusting the grayscale value of said central pixel comprises the steps of forming positive and negative weighted sums by multiplying said positive and negative sums, respectively, by first and second weighting factors, determining a subtrahend by subtracting said weighted negative sum from said weighted positive sum, forming an adjustment term by multiplying said subtrahend by a third weighting factor, and subtracting said adjustment term from the grayscale value of said central pixel.

6. The enhancing process of claim 5 wherein said threshold is a constant.

7. The enhancing process of claim 5 wherein said threshold is continuously, dynamically calculated as a function of the maximum and minimum grayscale values within a second window which encompasses said convolution window.

8. The enhancing process of claim 7 wherein said first, second, and third weighting factors are continuously, dynamically calculated as a function of said dynamically calculated threshold.

9. The enhancing process of claim 1 wherein said step of applying a convolution window to said image comprises the steps of selecting the first pixel of said image as said central pixel and thereafter stepping said convolution window pixel by pixel, row by row, until all of the pixels in said image have been processed.

10. The enhancing process of claim 1 wherein said step of selecting a grayscale image comprises the step of introducing a sequential stream of pixel grayscale values into an electronic processing system.

11. The enhancing process of claim 10 wherein said step of introducing a sequential stream of pixel grayscale values comprises scanning a printed image with a digital scanner.

12. The enhancing process of claim 10 wherein said step of introducing a sequential stream of pixel grayscale values comprises the photoelectric reading of a positive or negative film.

13. The enhancing process of claim 10 wherein said step of introducing a sequential stream of pixel grayscale values comprises inputting signals from a suitable video source.

14. The enhancing process of claim 1 wherein said characteristic grayscale value is the intensity value of said pixel.

15. The enhancing a process of claim 1 wherein said function for adjusting the value of said central pixel is the algorithm $$PC=Pc-(WbNb-WwNw)*f(Pc)$$

where:
f(Pc) is a table whose preselected values emphasize selected ranges of central pixel Pc values;

Nw is the number of white vectors in which Pc is lighter than the neighboring pixel Pn;

Ww is a weighting factor emphasizing transitions of Pc from lighter to darker pixels;

Nb is the number of black vectors in which Pc is darker than the neighboring Pn;

Wb is a weighting factor emphasizing transitions of Pc from darker to lighter pixels;

Pc is the original value of said central pixel; and

PC is the new, enhanced value for said central pixel.

16. The enhancing process of claim 1 wherein said step of selecting a digital grayscale image comprises a color image which has been transformed to a digital grayscale image by transformation equations, and further comprising the step of transforming said transformed digital grayscale image back into an enhanced color image.

17. A method of enhancing a grayscale image, comprising the steps of:

(a) inputting a grayscale image into an electronic system, said grayscale image comprising a set of pixels, each of which has a characteristic image value;

(b) imposing a convolution window on the first pixel of said image, said convolution window comprising a square matrix of an odd number of pixels, the central pixel of said convolution window being said first pixel;

(c) designating the central pixel in said window as the central pixel Pc;

(d) designating the remaining pixels in said window as neighboring pixels Pn;

(e) determining the difference in value between a selected pair of pixels within said window according to the formula $$D=(Pn_1-Pn_2)$$

where $Pn_1$ is one of the neighboring pixels Pn of a sequence of pixels in said convolution window selected seriatim and $Pn_2$ is either another neighboring pixel Pn or said central pixel Pc;

(f) determining the sign of said difference;

(g) determining the absolute value of said difference according to the formula $$AD=|Pn_1-Pn_2|$$

(h) comparing the absolute value of said difference with a threshold value S;

(i) if said absolute value is more than said threshold value S, proceeding to step (k), or (j) if said absolute value is less than or equal to said threshold value, the steps of returning to step (e), selecting seriatim the next pair of pixels, and repeating steps (f) through (j), unless all of the selected pixel pairs in said convolution window have been selected, whereupon proceeding to step (m);

(k) incrementing the count of either a positive sign sum or a negative sign sum, respectively, according to the sign of said sign of said difference;

(l) returning to step (e), selecting seriatim the next pair of pixels, and repeating steps (f) through (k), unless all of the selected pixel pairs have been selected, whereupon proceeding to step (m);

(m) determining the difference between said positive sign sums and said negative sign sums;

(n) adjusting the grayscale value of said central pixel as a function of the difference of said positive and negative sign sums; and (o) stepping said window to the next pixel in said image, pixel by pixel and row by row; and (p) repeating steps (c)–(o) until every pixel in said image has been designated as a central pixel.

18. The enhancing of claim 17, wherein said function of step (n) is the algorithm $$PC=Pc-(WbNb-WwNw)*f(Pc)$$

where:
f(Pc) is a table whose preselected values emphasize selected ranges of Pc values;
Nw is the number of white vectors in which Pc is lighter than the neighboring Pn;
Ww is a weighting factor emphasizing transitions of Pc from lighter to darker pixels;
Nb is the number of black vectors in which Pc is darker than the neighboring Pn;
Wb is a weighting factor emphasizing transitions of Pc from darker to lighter pixels;
Pc is the original value of said central pixel; and
PC is the new, enhanced value for said central pixel.

19. A system for enhancing a digital grayscale image, comprising:
means for inputting a digital grayscale image into said system, said image comprising a matrix of pixels, each of which has a characteristic value;
means for applying a convolution window to said image;
means for selecting the central pixel Pc from the neighboring pixels Pn within said convolution window;
means for enhancing said central pixel, said enhancing means comprising:
(a) means for comparing the characteristic values of a plurality of selected pairs of pixels within said convolution window, said comparing means for each selected pair of pixels yielding a vector comprising an indication of the magnitude of the change in value between said selected pair of pixels and the direction of said change in value;
(b) means for comparing said magnitude of each said selected pair of pixels to a threshold value;
(c) means for counting the number of vectors for all of said plurality of selected pairs which surpassed said threshold value for each said direction of change;
(d) means for adjusting the value of said central pixel as a function of the difference in the number of vectors for each said direction;
(e) means for transfering the adjusted value of said central pixel to a suitable location to be utilized; and
(f) means stepping said convolution window to the next pixel for adjustment thereof; and
means for ending said process.

20. The enhancing system of claim 19 wherein said function for adjusting the value of said central pixel is the algorithm $$PC=Pc-(WbNb-WwNw)*f(Pc)$$

where:
f(Pc) is a table whose preselected values emphasize selected ranges of Pc values;
Nw is the number of white vectors in which Pc is lighter than the neighboring Pn;
Ww is a weighting factor emphasizing transitions of Pc from lighter to darker pixels;
Nb is the number of black vectors in which Pc is darker than the neighboring Pn;
Wb is a weighting factor emphasizing transitions of Pc from darker to lighter pixels;
Pc is the original value of said central pixel; and
PC is the new, enhanced value for said central pixel.

* * * * *